April 3, 1951  F. W. HUDSON ET AL  2,547,124
MULTIPLE BALL BEARING PUNCHING BAG SWIVEL
Filed Nov. 28, 1947

INVENTORS
Frank W. Hudson
BY Albert M. Pilkington
Fred C. Matheny
ATTORNEY

Patented Apr. 3, 1951

2,547,124

UNITED STATES PATENT OFFICE 2,547,124

MULTIPLE BALL BEARING PUNCHING BAG SWIVEL

Frank W. Hudson, Bothell, and Albert M. Pilkington, Seattle, Wash.

Application November 28, 1947, Serial No. 788,382

3 Claims. (Cl. 287—23)

This invention relates to a multiple ball bearing punching bag swivel.

An object of this invention is to provide a punching bag swivel in which friction is reduced to a minimum and the punching bag is afforded the greatest possible freedom both as respects swinging movement and rotary or spinning movement of the bag.

Another object is to provide a multiple ball bearing punching bag swivel by which the action of the punching bag is speeded up by eliminating all possible friction in the means by which the bag is suspended.

Another object is to provide a punching bag swivel that is strong and durable in construction and capable of withstanding hard usage.

Other objects of the invention will be apparent from the following description taken in connection with the accompanying drawings.

In the drawings Figure 1 is a view in side elevation showing a punching bag supported by this swivel.

Like reference numerals designate like parts throughout the several views.

Figure 1:
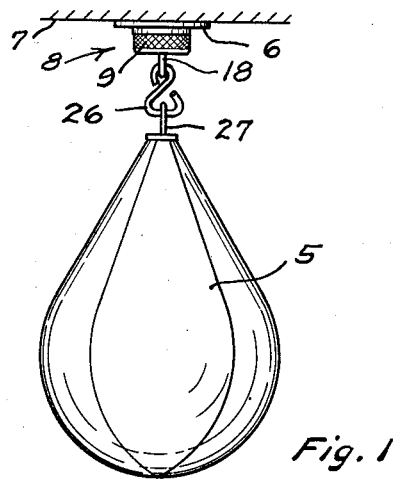

Referring to the drawings, 5 designates a punching bag, 6 designates a ceiling plate secured to a support, 7 and 8 designate, in a general way, this multiple ball bearing swivel by which the punching bag 5 is connected with the ceiling plate 6.

Figure 2:
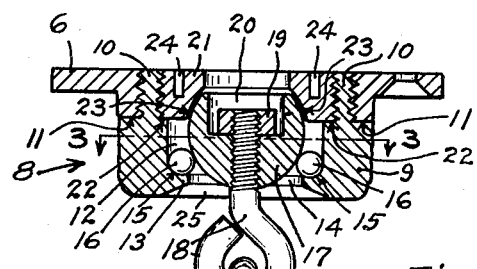
Fig. 2 is a vertical sectional view through this multiple ball bearing swivel.
Figure 3:
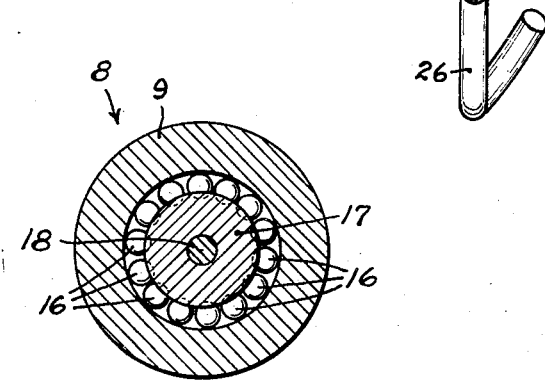
Fig. 3 is a sectional view through said swivel taken substantially on broken line 3—3 of Fig. 2.

This swivel comprises a bearing cup 9, see Fig. 2, having an externally threaded upwardly protruding shank 10. The shank 10 is adapted to be screwed into the ceiling plate 6 to secure the swivel to said plate. Preferably the exterior of the bearing cup is milled or otherwise roughened, as shown in Fig. 1, to provide a better surface by which it may be grasped for the purpose of turning the same to connect it with or disconnect it from the ceiling plate 6. A shoulder 11 is provided on the bearing cup 9 to engage with the bottom end portion of the ceiling plate 6.

The bearing cup 9 has an axially disposed opening or recess 12 therein. The recess 12 has an inwardly directed flange 13 positioned near the lower end of the cup 9 and leaving an opening 14 in the bottom of said cup. An annular bearing race 15 is provided on the flange 13. A plurality of balls 16 are operatively disposed in the annular race 15.

A large ball or spherical member 17 is disposed within the recess 12 and rests on the bearing balls 16. The large ball 17 when thus supported on the smaller balls 16 is substantially free of friction, can rotate freely on the axis of the cup 9, and can tilt, within a limited range, in any direction. A shank in the form of an eye bolt 18 is threaded into the large ball 17 and secured thereto by a lock nut 19. The lock nut 19 is disposed within a recess 20 in the large ball 17. A retainer plug 21 is threaded into the upper end of the cup 9 and rests on a shoulder 22. The retainer plug 21 has a spherically recessed lower portion 23 which is disposed in close proximity to the large ball 17 and prevents displacement of said large ball 17 without frictionally engaging the same. Preferably spanner holes 24 are provided in the plug 21 to facilitate insertion and removal of the same.

Preferably the bottom end of the cup 9 has a countersunk portion 25 around the opening 14 to provide more clearance for the eye portion of the eye bolt 18 and thereby allow more angular movement of said bolt and to provide a flat surface against which said eye portion can strike.

A hook 26 of conventional shape is secured to the eye bolt 18. The punching bag 5 is of ordinary well known construction and is provided with any approved means 27 for engagement with the hook 26.

By the use of this swivel the punching bag 5 is supported so that it is movable freely and with a minimum amount of friction in all directions. Thus the bag is very fast and true in its action and is accurate in its response to blows to which it is subjected. All swinging and spinning movements of the bag are taken care of in the multiple ball swivel and there is no tendency for the bag to spin reversely such as can occur when a punching bag is suspended on a flexible tie member.

The foregoing description and accompanying drawings clearly disclose a preferred embodiment of this invention but it will be understood that this disclosure is merely illustrative and that changes may be made within the scope of the following claims.

We claim:

1. A swivel for suspending a punching bag comprising a tubular bearing cup; an annular train of bearing balls operatively supported in a normally horizontal plane in said bearing cup; a large ball segment supported for universal movement on said bearing balls; a stem secured to said ball segment extending downwardly through the bottom of said cup and adapted to have a punching bag suspended therefrom; and a retaining plug in said bearing cup above said large ball segment, said retaining plug having a spherically recessed lower portion positioned in close proximity to but clear of the large ball segment, whereby said large ball segment is restrained from upward movement but has free and unrestrained angular movement on said bearing balls.

2. A swivel for suspending a punching bag from a ceiling plate comprising a tubular bearing cup having a normally upright axial opening extending therethrough, said opening being of smaller diameter adjacent the bottom end of the cup to thereby provide an inwardly directed annular flange; a normally horizontal annular bearing race provided on the upper side of said flange; an annular train of bearing balls in said race; a spherical member of relatively large diameter supported on said bearing balls for universal tilting movement and for rotary movement about a vertical axis; an eye bolt secured to said spherical member and extending downwardly therefrom out of said bearing cup, said eye bolt having eye means to which a punching bag can be connected; an externally threaded shank on the upper end of said bearing cup adapted to be threaded into a ceiling plate; and a retainer plug threaded into the upper end of the opening in said bearing cup in close proximity to and above said spherical member, said retaining plug having a spherically recessed lower portion positioned close to but clear of said spherical member, whereby said spherical member is restrained from upward movement but is free for unrestricted tilting and rotary movement on said bearing balls.

3. A swivel for suspending a punching bag from a ceiling plate which is provided with an internally threaded passageway, comprising a tubular bearing cup having a normally upright axial opening extending therethrough, said opening being of smaller diameter adjacent the bottom end of the cup to thereby provide an inwardly directed annular flange; a normally horizontal annular bearing race provided on the upper side of said flange; an annular train of bearing balls in said race; a spherical member of relatively large diameter supported on said bearing balls for universal tilting movement and for rotary movement about a vertical axis, said spherical member having a normally upright threaded opening therein and having a nut receiving recess of larger diameter than said opening in its upper portion communicating with the opening; an eye bolt having eye means to receive a punching bag supporting member and having a shank portion threaded into the threaded opening in said spherical member; a nut threaded onto the upper end portion of said eye bolt and positioned in said recess and locking said eye bolt to said spherical member; an upwardly extending tubular shank on said bearing cup, said shank having internal and external threads and the external threads on said shank being adapted for engagement with the internal threads of said ceiling plate; and an externally threaded retainer plug threaded into the internally threaded opening in the upper end of said bearing cup, said retainer plug having a spherically recessed lower portion positioned in close proximity to but clear of said spherical member whereby said spherical member is restrained from upward movement but is free for unrestrained tilting and rotary movement on said bearing balls.

FRANK W. HUDSON.
ALBERT M. PILKINGTON.

REFERENCES CITED

The following references are of record in the file of this patent:

UNITED STATES PATENTS

| Number | Name | Date |
|---|---|---|
| 807,100 | Wood | Dec. 12, 1905 |
| 823,594 | Frazee | June 19, 1906 |
| 823,595 | Frazee | June 19, 1906 |
| 1,504,910 | Schall | Aug. 12, 1924 |
| 1,701,683 | Leas | Feb. 12, 1929 |
| 2,452,778 | Matthewson | Nov. 2, 1948 |